United States Patent
McMullin

(10) Patent No.: US 8,589,198 B2
(45) Date of Patent: Nov. 19, 2013

(54) METHODS AND SYSTEMS INVOLVING POWER SYSTEM GRID MANAGEMENT

(75) Inventor: Dale Robert McMullin, Canton, GA (US)

(73) Assignee: General Electric Company, Schenectady, NY (US)

( * ) Notice: Subject to any disclaimer, the term of this patent is extended or adjusted under 35 U.S.C. 154(b) by 237 days.

(21) Appl. No.: 12/948,832

(22) Filed: Nov. 18, 2010

(65) Prior Publication Data

US 2012/0130767 A1 May 24, 2012

(51) Int. Cl.
*G06Q 10/00* (2012.01)

(52) U.S. Cl.
USPC ......................................... 705/7.11; 705/7.26

(58) Field of Classification Search
USPC ................. 705/7.13, 412, 7.11, 7.26; 307/38; 342/357.48; 361/49; 370/216, 218, 370/316, 389; 714/4.1, 14; 715/853
See application file for complete search history.

(56) References Cited

U.S. PATENT DOCUMENTS

| | | |
|---|---|---|
| 6,697,951 B1 | 2/2004 | Sinha et al. |
| 6,892,115 B2 | 5/2005 | Berkcan et al. |
| 2001/0043560 A1 * | 11/2001 | Liu et al. ........................ 370/216 |
| 2002/0080539 A1 * | 6/2002 | McClure et al. ................. 361/59 |
| 2004/0158772 A1 * | 8/2004 | Pan et al. ......................... 714/14 |
| 2006/0120278 A1 * | 6/2006 | Lim et al. ....................... 370/218 |
| 2006/0268679 A1 * | 11/2006 | Deng et al. .................... 370/216 |
| 2008/0231114 A1 * | 9/2008 | Tolnar et al. ..................... 307/38 |
| 2010/0094573 A1 * | 4/2010 | Yang et al. ....................... 702/61 |

* cited by examiner

*Primary Examiner* — Mark A Fleischer
(74) *Attorney, Agent, or Firm* — Cantor Colburn LLP

(57) ABSTRACT

A distribution control center includes a processor operative to receive damaged asset data, the damaged asset data including an identification and assessment of at least one damaged asset of a power grid, process the damaged asset data to associate a repair time with the damaged asset, generate a proposed switch plan, process the proposed switch plan to identify the damaged asset in the proposed switch plan and assigning a priority for repairing the damaged asset, generate switch plan modification data, modify the proposed switch plan to define a modified switch plan, and output the modified switch plan.

17 Claims, 3 Drawing Sheets

METHODS AND SYSTEMS INVOLVING POWER SYSTEM GRID MANAGEMENT

BACKGROUND OF THE INVENTION

The subject matter disclosed herein relates to power system grid management and in particular to power system grid maintenance management systems.

Power system grids include a variety of system assets such as, for example, generators, transmission lines, transformers, and associated control systems. The management of the grids may be performed in part, by a distribution control center that manages maintenance of assets that includes identifying faulty or inoperable assets, and tasking technicians to repair the assets. The distribution control center may include a distribution management system that generates a plan to restore grid functions following grid maintenance. The distribution management system commonly discovers locations for needed grid maintenance during planned restoration actions.

The operations of the distribution control center become increasingly complex following an event such as a storm that causes the failure of multiple grid assets over a short period of time. Increasing the efficiency and effectiveness of the distribution control center in managing the restoration of grid functions is desired.

BRIEF DESCRIPTION OF THE INVENTION

According to one aspect of the invention, a method for operating a power grid system includes receiving damaged asset data, the damaged asset data including an identification and assessment of at least one damaged asset, processing the damaged asset data to associate a repair time with the damaged asset, generating a proposed switch plan, processing the proposed switch plan to identify the damaged asset in the proposed switch plan and assigning a priority for repairing the damaged asset, generating switch plan modification data, modifying the proposed switch plan to define a modified switch plan, and outputting the modified switch plan.

According to another aspect of the invention, a power grid system includes a power grid including assets, and a processor system including a processor operative to receive damaged asset data, the damaged asset data including an identification and assessment of at least one damaged asset, process the damaged asset data to associate a repair time with the damaged asset, generate a proposed switch plan, process the proposed switch plan to identify the damaged asset in the proposed switch plan and assigning a priority for repairing the damaged asset, generate switch plan modification data, modify the proposed switch plan to define a modified switch plan, and output the modified switch plan.

According to yet another aspect of the invention, a distribution control center includes a processor operative to receive damaged asset data, the damaged asset data including an identification and assessment of at least one damaged asset of a power grid, process the damaged asset data to associate a repair time with the damaged asset, generate a proposed switch plan, process the proposed switch plan to identify the damaged asset in the proposed switch plan and assigning a priority for repairing the damaged asset, generate switch plan modification data, modify the proposed switch plan to define a modified switch plan, and output the modified switch plan.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Previous grid management systems included a distribution control center that was operative to receive grid status information, including, for example, the location and status of damaged assets from work crews. The distribution control centers would manage the repair of the assets by assigning work crews to repair the assets. The distribution control centers would also generate a switch plan that includes a series of steps in a sequence to reenergize the grid and restore grid services. The previous distribution control centers did not effectively coordinate the repairs performed on the grid and the switch plan to efficiently restore grid services. Most often, damaged assets were identified during the investigation or dispatching steps of routine outage management operations, or upon execution of a switch plan, where the failure of a specific step resulted in the discovery of a damaged asset. Improving reliability metrics associated with timely restorations is desired by proactively integrating time and cost of each potential repair in the scheduling and prioritization or restoration work.

Figure 1:
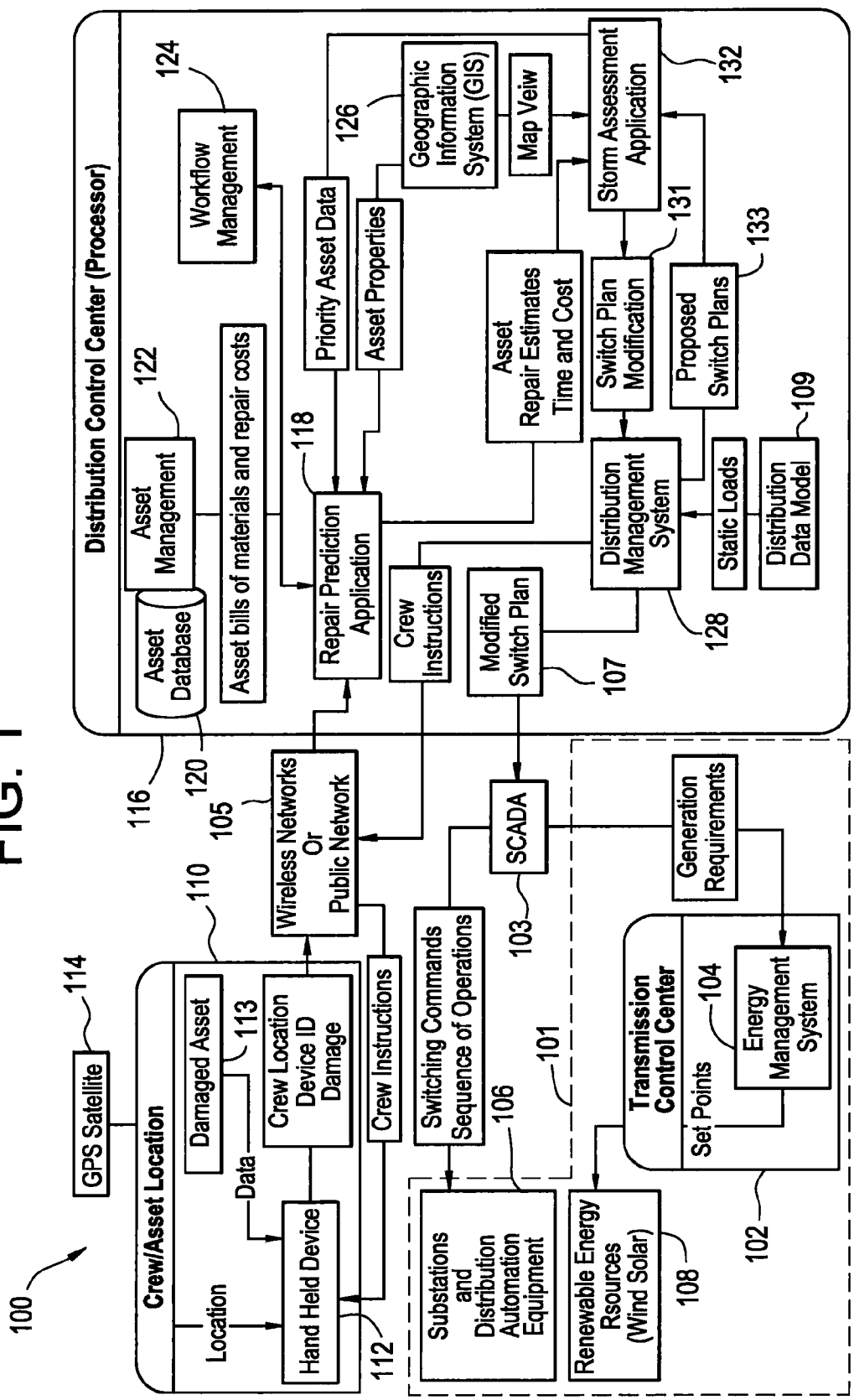
FIG. 1 illustrates a block diagram of an exemplary embodiment of a power grid operations system.

FIG. 1 illustrates a block diagram of an exemplary embodiment of a power grid operations system 100. The system 100 includes a grid 101 that includes a transmission control center subsystem 102 having an energy management system 104 that may include, for example, electrical power generators and associated control equipment, substations and distribution automation equipment 106, renewable energy resources 108. The grid 101 and transmission control center subsystem 102 are communicatively connected to a supervisory control and data acquisition (SCADA) subsystem 103 that includes, for example, a processing system that is operative to receive system data, logically process the system data, and output system commands, instructions, and system information.

A crew and asset location subsystem 110 includes a crew communications device that may include, for example a voice or data device that is operative to communicate information regarding assets in the grid 101 from a work crew or technician. In the illustrated embodiment, the crew and asset location subsystem 110 includes a handheld or mobile device 112 that is operative to receive data associated with a damaged asset 113 and location data for the asset that may, for example, be received from a geographic system such as a global positioning system (satellite) 114. A data network 105 such as, for example, a wireless or public data network communicatively connects the crew and asset location subsystem 110 with a distribution control center subsystem (DCC) 116 or other point where data is sent to be processed and used in support of generating a switch plan.

The distribution control center subsystem 116 includes a variety of components that manage grid monitoring and management, including repair and restoration operations. The DCC 116 may include one or more processors and associated components (e.g., input devices, output devices, data storage devices, databases, applications, and display devices) that are operative to logically receive, process, and output data. A repair prediction application 118 is communicative with the crew and asset location subsystem 110 via the data network 105, and receives crew location data, asset (device) identification data, and asset status data. The repair prediction application 118 receives data from an asset database 120 and asset management system 122. In some embodiments the asset database may be an integral component of the asset management system. The asset database 120 and asset management system 122 store data such as, for example, general asset replacement costs, repair material costs, estimated and/or averaged repair times, and bills of materials. The repair prediction application 118 receives additional data from a workflow management system 124 that manages work crew histories and availability. The repair prediction application 118 also receives data from a geographic information system 126 that is used to locate identified grid assets geographically and output the asset properties. In some embodiments asset properties and geographic locations are stored in multiple databases and applications that may be synchronized and/or reconciled by another means of data management.

The DCC 116 includes a distribution management system (DMS) 128 that generates a switch plan 107 for the grid 101. The switch plan 107 is a series of steps that are performed in a sequence to restore service to the grid 101. For example, following a repair to the grid 101, the switch plan 107 identifies specific grid assets (e.g., generators, breakers, transformers, substations) that are aligned and energized in a particular sequence to properly restore grid service while maintaining balanced voltage and frequency levels, providing continuous electrical service to energized sections. In operation, the DMS 128 receives information from a distribution data model 130 that includes, for example, a model of the grid 101 that includes the grid assets, normal values of the grid assets, and the current status of the grid assets. The DMS 128 uses the distribution data model 130 to generate the switch plan 107. The switch plan 107 is output to the SCADA 103 that outputs commands to the substations and distribution automation equipment and the work crews.

The DCC 116 includes a storm assessment application (SAA) 132 that receives data from the repair prediction application 118, such as, asset repair time and cost estimate data 111; and geographic information (map view) 113 from the GIS 126. The SSA 132 receives a proposed switch plan(s) 133 from the DMS 128. The SSA 132 uses the proposed switch plan 133 to identify priority assets to be repaired by work crews. For assets that have not been repaired, the SSA 132 generates priority asset repair data 135 that is sent to the repair prediction application 118, which prioritizes work crew assignments (work orders). The SSA 132 generates switch plan modification data 109 based on the data received from the repair prediction application 118 and the GIS 126. The SSA 132 sends the switch plan modification data 109 to distribution management system 128. The DMS 128 uses the switch plan modification data 109 to reevaluate assets that can be energized when regenerating the switch plan 107. The operation of the system 100 and the DCC 116 is described in further detail below.

Figure 2:
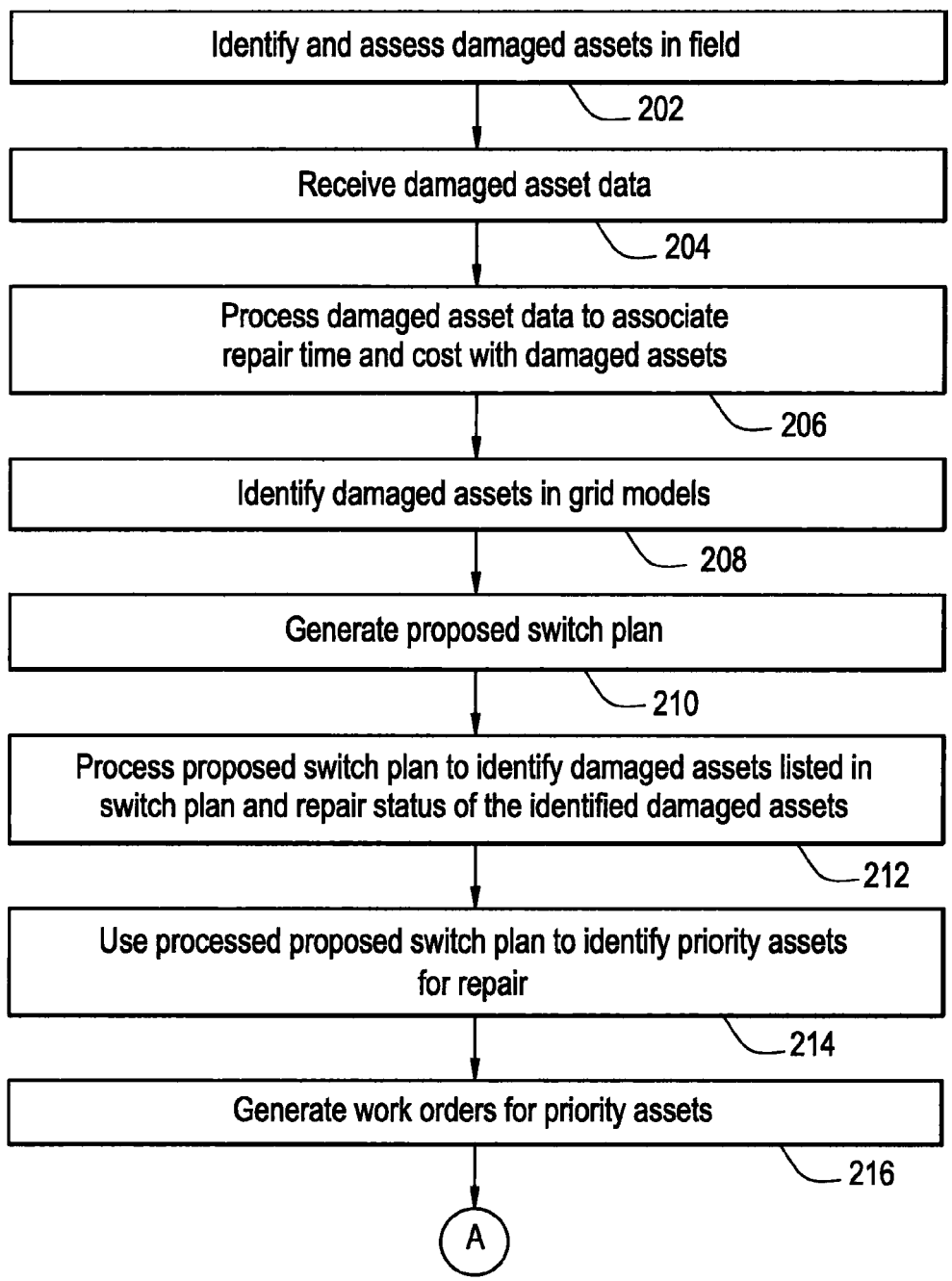
FIGS. 2 and 3 illustrate a block diagram of an exemplary method for operating the system of FIG. 1.
Figure 3:
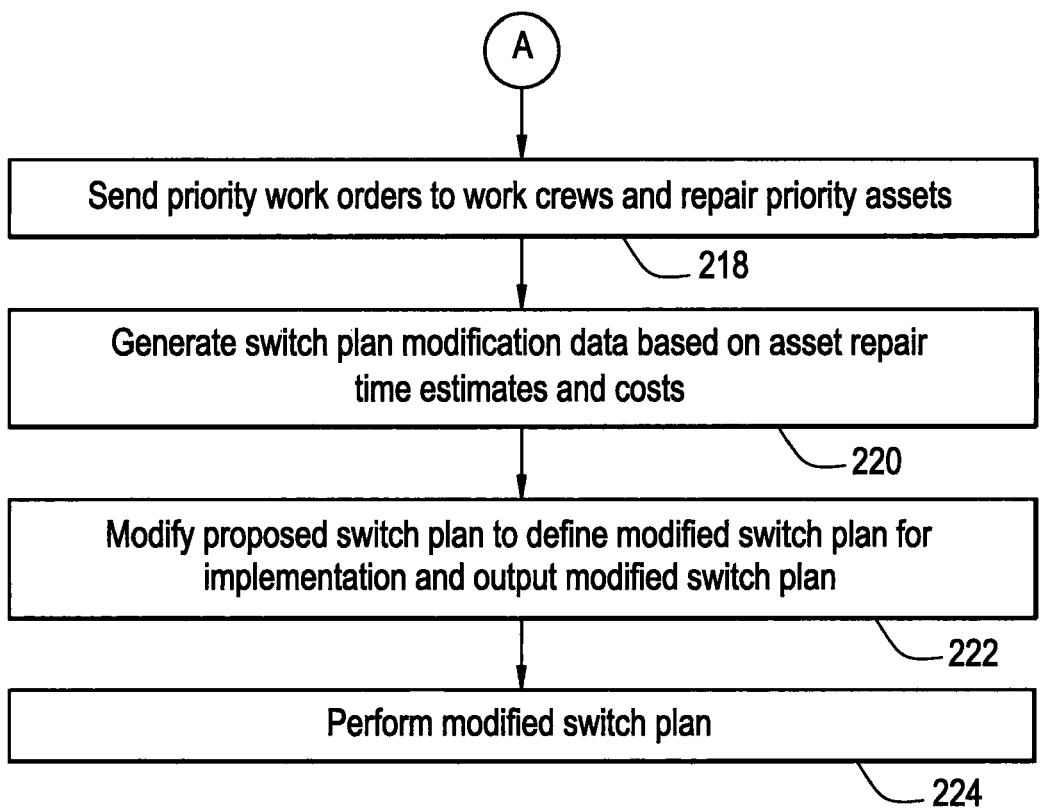

FIGS. 2 and 3 illustrate a block diagram of an exemplary method for operating the system 100 (of FIG. 1). Referring to FIG. 2, in block 202, damaged assets are identified and assessed. The identification and assessment may be performed by, for example, work crews in the field who send the damaged asset data to the DCC 116 that receives the damaged asset data in block 204. In block 206, The repair prediction application 118 uses the asset management system 122 and the workflow management system 124 to process the damaged assed data to associate repair times and costs with the damaged assets. The damaged assets are identified in models of the grid (distribution data model 109) in block 208. In block 210, the DMS 128 generates a proposed switch plan 133. The proposed switch plan 133 is defined by the status of the grid and includes a list of steps to be performed to restore grid operations. Damaged assets may delay or prevent the ability to perform the list of steps in the switch plan. In block 212, the proposed switch plan 133 is processed by the SAA 132 to identify the damaged assets and the repair status of the damaged assets listed in the proposed switch plan 133. The SAA 132 uses the proposed switch plan to identify priority damaged assets for repair in block 214. The priority damaged assets may be identified by, for example, determining grid service goals and identifying the priority damaged assets for repair using an optimization scheme based on asset repair times and costs. In block 216, priority asset data (including the identified priority damaged assets) is received by the repair prediction application 118 to generate priority work orders associated with the identified priority damaged assets. In block 218, the priority work orders are sent to the work crews for execution. The SAA 132 generates switch plan modification data 131 based on the asset repair time estimates and costs in block 220. In block 222, the DMS 128 receives the switch plan modification data 131 and modifies the proposed switch plan 133 to define a modified switch plan 107. The modified switch plan 107 is sent to the work crews and SCADA 103 for implementation.

The methods and systems described above integrate the operation of the repair prediction application 118 (of FIG. 1) and the distribution management system 128 using the storm assessment application 132. The integration allows priority damaged assets to be identified and repaired based on grid service goals, a proposed switch plan, and asset repair time and cost data. The identified priority assets may be repaired, and a modified switch plan is generated and implemented to more effectively and efficiently restore grid service.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for operating a power grid system, the method comprising:

receiving damaged asset data, the damaged asset data including an identification and assessment of at least one damaged asset of the power grid system, wherein an asset of power grid system includes a component of the power grid system;

processing the damaged asset data to associate a repair time and a repair cost with the damaged asset;

generating a proposed switch plan with a processor, wherein the proposed switch plan includes a series of steps in a sequence to restore power grid system services;

processing the proposed switch plan to assign, to each damaged asset in the proposed switch plan, a priority for repairing the damaged asset;

generating switch plan modification data with the processor;

modifying the proposed switch plan to define a modified switch plan; and outputting the modified switch plan.

2. The method of claim 1, wherein the method includes generating a work order associated with the assigned priority for repairing the damaged asset following the processing of the proposed switch plan.

3. The method of claim 1, wherein the proposed switch plan includes a sequence of operations that are operative to restore grid services to inactive portions of the grid.

4. The method of claim 1, wherein the switch plan modification data is generated using the repair time associated with the damaged asset.

5. The method of claim 1, wherein the switch plan modification data is generated using the repair time and repair cost associated with the damaged asset.

6. The method of claim 1, wherein the modified switch plan is output to an operator.

7. A power grid system comprising:

a power grid including assets; and a processor system including a processor operative to receive damaged asset data, the damaged asset data including an identification and assessment of at least one damaged asset, wherein an asset of power grid system includes a component of the power grid system, process the damaged asset data to associate a repair time and a repair cost with the damaged asset, generate a proposed switch plan, wherein the proposed switch plan includes a series of steps in a sequence to restore power grid system services, process the proposed switch plan to assign, to each damaged asset in the proposed switch plan, a priority for repairing the damaged asset, generate switch plan modification data, modify the proposed switch plan to define a modified switch plan, and output the modified switch plan.

8. The system of claim 7, wherein the processor is further operative to generate a work order associated with the assigned priority for repairing the damaged asset following the processing of the proposed switch plan.

9. The system of claim 7, wherein the proposed switch plan includes a sequence of operations that are operative to restore grid services to inactive portions of the grid.

10. The system of claim 7, wherein the switch plan modification data is generated using the repair time associated with the damaged asset.

11. The system of claim 7, wherein the switch plan modification data is generated using the repair time and repair cost associated with the damaged asset.

12. The system of claim 7, wherein the modified switch plan is output to an operator.

13. A distribution control center system comprising:

an input device operative to receive damaged asset data, the damaged asset data including an identification and assessment of at least one damaged asset of a power grid system, wherein an asset of the power grid system includes a component of the power grid system; and a processor to process the damaged asset data to associate a repair time and a repair cost with the damaged asset, generate a proposed switch plan, wherein the proposed switch plan includes a series of steps in a sequence to restore power grid system services, process the proposed switch plan to assign, to each damaged asset in the proposed switch plan, a priority for repairing the damaged asset, generate switch plan modification data, modify the proposed switch plan to define a modified switch plan, and output the modified switch plan.

14. The distribution control center system of claim 13, wherein the processor is further operative to generate a work order associated with the assigned priority for repairing the damaged asset following the processing of the proposed switch plan.

15. The distribution control center system of claim 13, wherein the proposed switch plan includes a sequence of operations that are operative to restore grid services to inactive portions of the grid.

16. The distribution control center system of claim 13, wherein the switch plan modification data is generated using the repair time associated with the damaged asset.

17. The distribution control center system of claim 13, wherein the switch plan modification data is generated using the repair time and repair cost associated with the damaged asset.

* * * * *